Patented Jan. 1, 1952

2,581,094

UNITED STATES PATENT OFFICE 2,581,094

PREPARATION OF DRYING OILS

Anthony H. Gleason, Westfield, and Stanley E. Jaros, Rahway, N. J., assignors to Standard Oil Development Company, a corporation of Delaware No Drawing. Application September 29, 1948, Serial No. 51,867

9 Claims. (Cl. 260—666)

This invention relates to synthetic drying oils and more particularly relates to the manufacture of oily linear polymers by the bulk polymerization of a diolefin or a mixture of a diolefin with a vinyl compound at a relatively low temperature and in the presence of a peroxide catalyst.

It is known to prepare oily products by polymerizing diolefins such as butadiene, its homologs, or mixtures of diolefins with vinyl compounds. Serial No. 782,850, filed October 29, 1947, in the name of Erving Arundale, Anthony H. Gleason, and Fred W. Banes, describes and claims a particularly efficient method for preparing such oils by polymerizing diolefins or a diolefin and a vinyl compound under 3 to 30 atmospheres pressure at a temperature not over 150° C. for a period of time between 3 and 60 hours in the presence of a peroxide catalyst and a diluent which may or may not be inert with respect to the polymerization process. The product of this process has a molecular weight between 2000 and 5000 and is particularly useful as a drying oil.

The above process, however, has the disadvantage that considerable amounts of insoluble solid and/or gel-like polymer are formed on the reactor walls, particularly in the vapor space. In commercial operation the formation of such polymer would be accelerated and would offer the hazard of plugging up the lines and reducing yields.

It is therefore the main object of this invention to provide a method of overcoming or at least considerably reducing the formation of this undesirable insoluble polymer.

The objects of this invention are accomplished by continually contacting the vapor space surfaces of the reactor with a portion of the liquid phase in the reactor. This may be accomplished in any desired manner. In batch operation in a bomb, the bomb may simply be shaken to ensure a constant supply of liquid phase on the walls of the reactor. In large scale equipment, and in particular, in continuous operation a portion of the liquid phase may be pumped to the top of the reactor and allowed to cascade down the walls.

By the principles of the present invention, oily diolefin polymers or copolymers can be produced in bulk by the use of a peroxide catalyst under such conditions that about 35 to 70% of the monomer charge is converted into the desired drying oil. This method is unusually flexible in that the molecular weight of these oily polymers can be most advantageously and accurately controlled within a wide range of predetermined limits below those of rubbery polymers by the proper selection of a diluent and/or other modifier, by adjusting the catalyst concentration of the feed and by keeping the conversion below 70%.

In practicing this invention a polymerizable diolefin or a mixture of diolefins, or a mixture containing a diolefin and a polymerizable coreactant containing a single C=C group, a catalytic amount of a peroxide type catalyst, and a diluent with or without other polymerization modifiers, are charged into a pressure vessel and the vessel is then maintained at a superatmospheric pressure of about 3 to 20 or 30 atmospheres and at a temperature not in excess of 150° C., preferably between 80° and 125° C. The usual reaction period for such a polymerization has been found to be between 3 and 25 or even 60 hours, depending primarily on the catalyst concentration.

The product, an oily polymer or a solution of the polymer having a molecular weight preferably between 2000 and 5000, is then removed from the pressure vessel and the unreacted monomers are allowed to volatilize or are removed by distillation. When desired the viscosity of the product may be cut back by a diluent, adding, for instance, up to equal parts by volume of an inert solvent such as benzol, xylene, solvent naphtha, a petroleum hydrocarbon fraction boiling in the range of about 150° C. to 200° C. or other solvents suitable for diluting linear polymers of oily character. In general, for the most practical manner of application, these diluted drying oils should preferably have a viscosity of between about 1 and 3 poises at 50% N. V. M. (non-volatile matter), although a range of 0.5 to 10 or 15 is usable for specific purposes.

Conversely, if a very large amount of diluent was present during the polymerization reaction, it may be desirable to evaporate a portion or all of the diluent at the end of the polymerization period, or eventually replace the original diluent by another one. If the product is to be used as a protective film-forming coating, solvents boiling between about 100 to 200° C. are usually preferred, while solvents outside of this range may be useful if the product is intended for other uses, for example in printing ink formulations or for adhesives. Usual drying oils of natural origin and/or resins known in the coating art may also be added to the product, but such addition has not been found necessary because the drying oils themselves possess such excellent properties that such additional ingredients are of little benefit.

In preparing the drying oils according to this invention, butadiene-1,3 is the preferred polymerizable raw material. Other useful polymerizable materials are isoprene, piperylene, the dimethyl-butadienes and methylpentadienes, dicyclopentadiene, chloroprene, bromoprene, mixtures of any of the aforementioned diolefins, and generally all diolefins having from 4 to 6 carbon atoms per molecule.

Instead of polymerizing the diolefinic monomers alone, it is possible to use mixtures of diolefins with monoolefins or polymerizable compounds containing a single C=C group, such as ethyl fumarate, ethyl maleate, methyl acrylate, methyl methacrylate, acrylonitrile, methacrylonitrile, vinyl acetate, vinyl chloride, vinylidene chloride, trichloroethylene, vinyl isobutyl ether, styrene, methyl styrene, para-methyl styrene, all mono- and di-chloro-styrenes, chloromaleic anhydride, and the like. The vinyl compounds are preferably present in minor proportions, e. g., 5 to 30% by weight of the total polymerizable mixture. In general, the presence of the above mentioned vinyl compounds in the monomeric mixture tends to accelerate the polymerization rate, especially in the case of acrylonitrile, styrene, or methylmethacrylate.

Another benefit obtained by polymerizing mixtures containing the above mentioned monoolefinic compounds is the lower unsaturation of the copolymerized product and hence improved aging properties, while the somewhat reduced drying rate can be brought up to the desired standards by incorporation of driers in the oil. Furthermore, especially in the case of acrylonitrile copolymers, the soap and caustic resistance of films resulting therefrom was found to be superior to the reistance of comparable diolefinic homo-polymers, this advantage being somewhat balanced by a darker coloration of the product and by the increased complexity of the apparatus necessary for recovering unreacted monomers from the polymerization. At any rate, it will be seen from the foregoing description that by a judicious selection of monomers a wide variety of products can be obtained by the present process, the character of the products being susceptible of still further control or modification by a proper variation of additional factors mentioned below.

In order to obtain economical yields of the desired oily polymers of the preferred molecular weight, it has been found that the polymerization is best conducted at moderate temperatures, for instance, between 75 and 140° C., using a peroxide type catalyst. In particular, we have found that cumene hydroperoxide having the formula

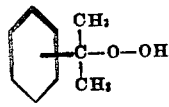

is unusually effective in catalyzing the reaction. This hydroperoxide may be used either in its chemically pure form or may equally well be in the form of the relatively inexpensive commercial mixture containing, for instance, 50 to 60 wt. per cent of cumene hydroperoxide and 50 to 40 wt. per cent of unconverted, inert cumene plus other components.

The useful range of concentration of peroxide type catalysts generally can be defined for the purposes of the present invention as being between 0.3 and 3 mol percent of active catalyst ingredient based on the monomer, preferably between 1 and 1.5 mol per cent.

Besides cumene hydroperoxide, catalyst which possess a similarly outstanding effectiveness in the process of our invention include t-butyl hydroperoxide, ortho-, meta-, or para-cymene hydroperoxide, t-butyl perbenzoate and cumene perbenzoate. All of these compounds can be represented by the general formula

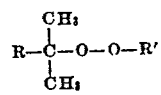

wherein R is selected from the group consisting of methyl, phenyl and tolyl and wherein R' is selected from the group consisting of hydrogen and benzoyl. Hence it will be seen that our preferred catalysts are characterized by having the —O—O— group linked to a tertiary carbon atom and further characterized by the total absence of secondary hydrogen atoms from the molecule.

However, other peroxides which are hydrocarbon soluble, such as acetyl peroxide, benzoyl peroxide, t-amyl hydroperoxide or perbenzoate, and the like, are also useful, though being only about one-half as effective on a molar basis as the aforementioned preferred compounds.

The preferred diluents for use in the present invention are butane, xylene, benzol, toluene, cyclohexane, solvent naphtha, or a petroleum hydrocarbon fraction boiling between —15° C. and 200° C., or generally non-olefinic hydrocarbon solvents boiling between —15° C. and 200° C. On the other hand, solvents such as carbon tetrachloride, chloroform, halogenated hydrocarbons boiling between 60 and 200° C. generally, and olefinic solvents may be also used but are not inert toward the reaction. The halogenated solvents may sometimes be preferred over the inert ones because they exert a modifying effect on the polymerization reaction without seriously affecting the reaction rate, but isobutylene and the normal butenes lower the catalyst efficiency and tend to result in low conversions.

The viscosity of the product can be controlled by adding to the monomeric polymerization mixture, 0.3 to 5 weight percent of diisopropyl xanthogen disulfide (hereinafter also referred to as DXD) which is preferred for this purpose because it is outstanding in that it does not affect the reaction rate appreciably. Among other modifiers useful in the present process, flowers of sulfur (which probably are converted into other compounds during the course of the polymerization) have also been found quite effective in keeping the viscosity of the polymeric product in the preferred range between 1 and 5 poises, but this use of sulfur can be disadvantageous because of the malodorous by-products formed.

Still another effective modifier is carbon tetrachloride which can be used in amounts as high as 100% by volume of the polymerizable material and which in addition to its normal effect as a diluent can influence the polymerization by playing a more vigorous role in the mechanism of active chain transfer and/or termination.

The following specific examples are still further descriptive of the present invention which gives excellent yields of linear, water-white oily polymers in an economical manner, with only about 0.1 to 4 wt. percent of the diolefin charge going to dimer. No treatment is required to improve the color or odor of the resulting products, which are highly satisfactory, dry well and form superior varnish-like finishes when baked or air dried. It will be understood that these examples are presented only as illustrations and not as limitations of the invention.

Example I 100 parts by weight of butadiene, an equal volume (123 parts by weight) of a petroleum diluent having a boiling range of 150–200° C. and 8.5 parts by weight of commercial cumene hydroperoxide (50% purity) were charged to a stainless steel reactor and heated in a quiescent condition under self-generated pressure for 15 hours at 100° C. The maximum pressure was about 180 p. s. i. At the end of the run unpolymerized butadiene was stripped from the crude product at 70° C. and the polymer concentration brought to 50% by vacuum distillation of the diluent. Conversion was 64% of the butadiene charged and the viscosity of the resulting solution was 3.0 poises.

After the completion of five such runs, an amount of insoluble, solid polymer, to the extent of 2.3% of the total butadiene charged, was found to have been deposited on the walls of the bomb lying above the surface of the liquid.

Example II

The process of Example I was repeated while shaking the bomb horizontally so as to continually supply the liquid phase to the walls of the reactor above the normal surface of the liquid. After 110 hours operation or the equivalent of five runs, the amount of solid, insoluble polymer found on the walls of the bomb amounted to only 0.5% by weight of the total butadiene charged and was equally distributed between the portions of the walls lying above and below the normal surface of the liquid in the bomb. Therefore, over a period of five runs, wall-wetting resulted in the formation of only 22% of the normal amount of popcorn polymer or a reduction of 78%. Five runs appeared to be the optimum for comparative purposes since larger accumulations of insoluble polymer were likely to be partially sloughed during agitation.

On adding 0.3% lead naphthenate and 0.03% (by weight) of manganese naphthenate as driers to the oily product, films of 0 5 to 1.0 mil thickness, prepared by dipping a thin metal sheet into the oil, dried in air dust-free in 4 hours, the dried films being characterized by a high gloss. Films baked for one hour at 125° C. in the absence of any drier possessed superior flexibility, adhesion, and hardness and were found to be very resistant to water, soap and grease. Alkali resistance was fair. Air-dried films, after 48 hours, were slightly inferior to the baked coatings, but generally good except for resistance to alkali.

Fadometer tests at 140° F. for 300 hours revealed no visible checking or other sign of deterioration of either the air-dried or baked films, except for a slight yellowing.

In view of the exceptionally favorable properties of the clear films obtained upon drying the oily products of this invention, the products are particularly suitable as vehicles for paints and enamels to which any desired color may be imparted by admixing an appropriate pigment therewith. Conventional driers such as compounds of lead, manganese or cobalt may also be added to accelerate the rate of drying in air, but addition of such driers is usually unnecessary in the case of baked enamels. In general, enamels prepared from our product dry in air to form films with excellent gloss and color, satisfactory flexibility and strong adhesiveness. The films present a hard, smooth, waxy, mar-proof surface.

By use of a diluent, modifier or reaction conditions which give desirable low-viscosity product, the rate of formation of this insoluble polymer in the liquid phase is tolerable and can be handled in commercial operations since most of the insoluble polymer formed in the liquid phase leaves the reactor with the liquid product and can subsequently be filtered out.

However, in the vapor space, where the concentration of butadiene is high, insoluble polymer forms rapidly on the walls of the reactor. This formation is apparently autocatalytic and its rate accelerates logarithmically. Furthermore, the insoluble polymer does not leave the reactor with the product and thus accumulates so that reactor must be opened at relatively frequent intervals for costly and hazardous manual cleaning.

Ordinary methods of inhibiting the formation of the insoluble polymer on the walls in the vapor space, such as treatment with nitrites or organic inhibitors, are not effective because peroxides are used as catalyst and quickly destroy the inhibitors.

From the above examples it is evident that this invention effectively combats the insoluble polymer problem by leaving no vapor space having high concentration of diolefin in contact with the wall and thus greatly reducing rate of insoluble polymer formation. The flushing operation, in addition to reducing rate of insoluble polymer formation, also has the function of washing down a major portion of the polymer that does form so that it can be carried out of the reactor with the product and subsequently filtered out.

The nature and objects of the present invention having been thus fully set forth and specific examples of the same given, what is claimed as new and useful and desired to be secured by Letters Patent is:

1. In a selective polymerization process for preparing drying oils wherein a conjugated diolefin having 4 to 6 carbon atoms per mollecule is heated in the liquid phase in a reaction zone at a temperature between 50 and 150° C., under superatmospheric pressure and in the presence of a hydrocarbon soluble peroxide catalyst for a period sufficient to convert not more than 80% of the diolefin into a linear oily polymer and not more than 5% into a diolefin dimer, the method of reducing the formation of solid insoluble polymer which comprises continually flushing the entire interior surfaces of the gas space above the liquid level of the reaction zone with at least a portion of the liquid phase.

2. A process according to claim 1 wherein 1 volume of diolefin is polymerized in the presence of ⅕ to 5 volumes of a diluent boiling between −15° C. and 200° C.

3. In a process for preparing drying oils by heating butadiene-1,3 in the liquid phase at a temperature between 50 and 150° C. in a closed reaction zone under its autogenous pressure in the presence of 0.3 to 2 mol per cent per mol of butadiene of a catalyst having the formula

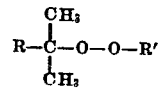

wherein R is a member selected from the group consisting of methyl and phenyl and R' is a member selected from the group consisting of hydrogen and benzoyl, continuing the heating until a linear oily polymer having a molecular weight between 1000 and 10,000 is formed the improvement which comprises simultaneously continuously flushing the entire interior surfaces of the gas space above the liquid level of the reaction zone with at least a portion of the liquid phase.

4. A process according to claim 3 wherein the catalyst is cumene hydroperoxide.

5. A process according to claim 3 wherein the catalyst is t-butyl hydroperoxide.

6. A process according to claim 3 wherein 0.3 to 5 weight per cent based on butadiene of diisopropyl xanthogen disulfide is added to the polymerizable charge.

7. In a process for preparing drying oils by mixing 70 to 95 parts by weight of a conjugated diolefin having 4 to 6 carbon atoms per molecule and 30 to 5 parts by weight of a copolymerizable compound having a single —C=C— group, heating the resulting mixture in the liquid phase in a reaction zone at a temperature between 50 and 150° C. and at a pressure ranging from 3 to 30 atmospheres in the presence of 0.3 to 3 mol per cent per total monomer of a catalyst having the formula

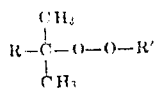

wherein R is a radical selected from the group consisting of methyl and phenyl and wherein R' is a radical selected from hydrogen and benzoyl, thereby forming a water-white linear oily copolymer having a molecule weight between 1000 and 10,000, the improvement which comprises simultaneously continually flushing the entire interior surfaces of the gas space above the liquid level of the reaction zone with at least a portion of the liquid phase.

8. In a process for selectively converting diolefins into unsaturated oily polymers by heating one volume of liquid butadiene monomer with ⅕ to 5 volumes of a hydrocarbon diluent boiling between 80 and 200° C., and 1 to 7 weight percent of cumene hydroperoxide based on monomer, heating the mixture for 3 to 60 hours in the liquid phase in a closed reaction zone at a temperature between 80 and 125° C. at the autogenous pressure, whereby a major proportion of monomer is converted into a hydrocarbon soluble drying oil and only between 0.1 and 5% by weight of monomer is converted into dimer and 0 to 0.5% into insoluble polymer, releasing pressure from the reaction zone, stripping unpolymerized monomer from the polymerized reaction mixture, fractionating the stripped mixture to remove the dimer and excess hydrocarbon diluent therefrom, and recovering a solution of said drying oil in said hydrocarbon diluent, the improvement which comprises continually flushing the entire interior surfaces of the gas space above the liquid level of the reaction zone with at least a portion of the liquid phase.

9. In a selective process for the production of a synthetic drying oil by mixing 70 to 95 parts by weight of butadiene, 30 to 5 parts by weight of styrene, 20 to 100 parts by weight of an inert, non-olefinic hydrocarbon diluent boiling between 80 and 200° C. and 2.5 to 7 parts by weight of cumene hydroperoxide, heating the resulting mixture for 3 to 25 hours in the liquid phase in a closed reaction zone at a temperature between 80 and 125° C. at a pressure of 3 to 20 atmospheres, whereby 35 to 70% by weight of the monomers is converted into a hydrocarbon soluble drying oil, only between 0.1 to 5% by weight of the monomers is converted into a cyclic dimer, and 0–0.5% to an insoluble polymer, releasing pressure from the reaction zone, removing unpolymerized monomers and the cyclic dimer from the polymerized reaction mixture, and recovering said drying oil as a solution in said hydrocarbon diluent, the improvement which comprises continually flushing the entire interior surfaces of the gas space above the liquid level of the reaction zone with at least a portion of the liquid phase.

ANTHONY H. GLEASON.
STANLEY E. JAROS.

REFERENCES CITED

The following references are of record in the file of this patent:

UNITED STATES PATENTS

| Number | Name | Date |
|---|---|---|
| 2,085,524 | De Simo et al. | June 29, 1937 |
| 2,315,080 | Reid | Mar. 30, 1943 |
| 2,389,240 | Reid | Nov. 20, 1945 |
| 2,450,547 | Gaylor | Oct. 5, 1948 |